C. T. LITCHFIELD.
Machine for Cutting Screw-Threads.
No. 162,931.  Patented May 4, 1875.
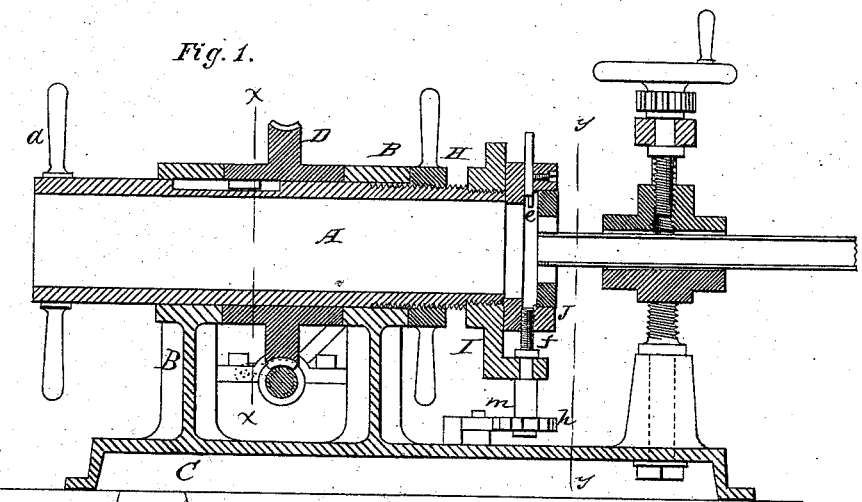
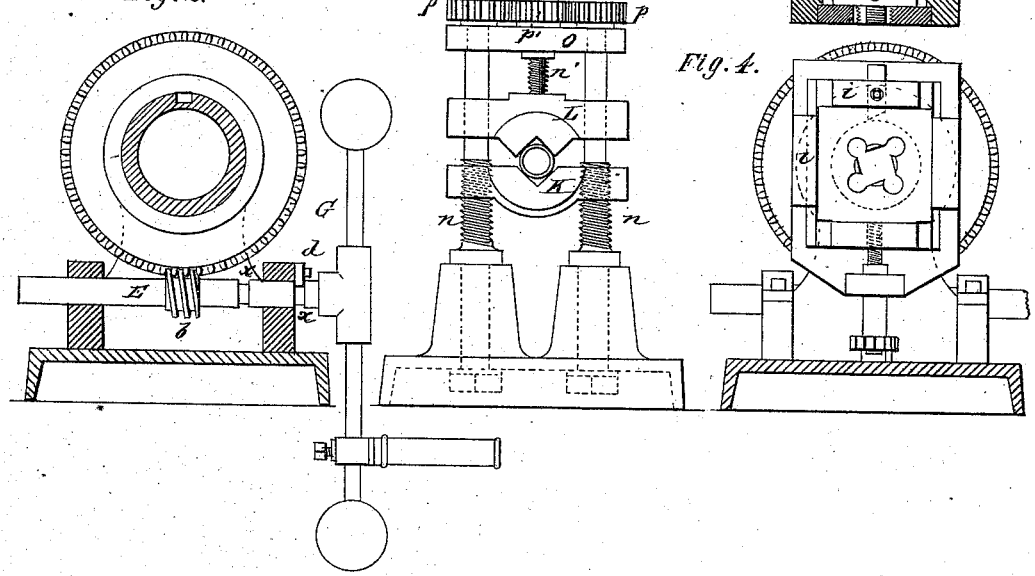
Witnesses.
C. H. Watson
P. C. Dieterich
Inventor:
Chas. T. Litchfield
per.
C. H. Watson & Co
Atty's
THE GRAPHIC CO.PHOTO-LITH.39 & 41 PARK PLACE,N.Y.

UNITED STATES PATENT OFFICE.

CHARLES T. LITCHFIELD, OF BROOKLYN, NEW YORK.

IMPROVEMENT IN MACHINES FOR CUTTING SCREW-THREADS.

Specification forming part of Letters Patent No. 162,931, dated May 4, 1875; application filed March 27, 1875.

*To all whom it may concern:*

Be it known that I, CHARLES T. LITCHFIELD, of Brooklyn, in the county of Kings and State of New York, have invented certain new and useful Improvements in Machine for Cutting and Threading Pipes and Bolts; and I do hereby declare that the following is a full, clear, and exact description thereof, which will enable others skilled in the art to which it pertains to make and use the same, reference being had to the accompanying drawings and to the letters of reference marked thereon, which form a part of this specification.

The nature of my invention consists in the construction and arrangement of a machine for cutting off and threading pipes and bolts, as will be hereinafter more fully set forth.

In the annexed drawing, Figure 1 is a longitudinal vertical section of my machine. Fig. 2 is a transverse vertical section of the same through the line $x\,x$, Fig. 1. Fig. 3 is an end view of the machine. Fig. 4 is a transverse vertical section of the same through the line $y\,y$, Fig. 1. Fig. 5 is a detached view of a part of the machine.

A represents a hollow sliding spindle, which works in two upright bearings, B B, cast to the bed-plate C of the machine. The spindle has on its rear end handles $a\,a$, for turning it rapidly for threading small pipes, and upon that portion of the spindle between the bearings B B is fitted a worm-wheel, D, with a key or feather in its hub to work in a groove in said spindle, and engaging a worm, $b$, upon the driving-shaft E, located across and underneath said spindle, and working in bearings upon the bed C. The driving-shaft E is provided with a balance hand-crank, G, for driving the spindle slowly and powerfully for threading large pipes or bolts. The shaft E is made to slide in its bearings, and has two circumferential grooves, $x\,x$, cut in it, into which a pawl, $d$, on one of the bearings, engages, so that the worm $b$ may be held engaged in the worm-wheel D, or that the worm and shaft may be moved and the worm entirely disengaged from the worm-wheel. The work or pipe to be operated upon is held in a self-centering vise, which will be hereinafter described. The spindle A is at its front end provided with exterior screw-threads, extending for a suitable distance thereon, and on said part of the spindle is placed a threaded collar, H, which works against the forward bearing of the spindle for starting the die upon the work. Upon the forward end of the spindle A is attached a head, I, with a cross-slide, J, carrying the cutting-off tool $e$, and a feed-screw, $f$, for the slide, works in a nut on the head I. Both the head and slide have projections $i$, between which the threading-die is held. On the outer end of the feed-screw $f$ is secured a ratchet-wheel, $h$, which passes a stud or pawl, $m$, on the bed-plate C during the revolution of the spindle for turning the same automatically. The vise, in which the work is held, has two upright parallel guide-spindles, $n\,n$, passing through the jaws K L of the vise, their lower ends working in long bearings projecting up from the bed-plate, and their upper ends are connected by means of a cross-head, O, in which they turn loosely, and their top ends have each a pinion, $p$, secured to it, of equal dimensions. The cross-head O has a central screw-spindle, $n'$, attached, which has a hand-wheel, $p$, on its upper end, and under it a pinion, $p'$, to engage, and of equal dimensions with the pinions $p\,p$ on the screw-spindles $n\,n$. The upper jaw L slides loose on the guide-spindles $n\,n$, but is moved up or down by means of the central screw-spindle $n'$, which is fitted with its screw-thread to pass into it. The portions of the guide-spindles $n\,n$ passing through the lower jaw K have equal screw-threads, to which said jaw is fitted. The screw-threads on all of said three spindles pass around them in like direction, and are of the same pitch, so that in turning the hand-wheel P on the central spindle $n'$ all three spindles turn with equal speed and move both jaws equally together or apart, according to the direction in which said hand-wheel is turned.

Having thus fully described my invention, what I claim as new, and desire to secure by Letters Patent, is—

1. The hollow spindle A, with the handles $a$ for direct propulsion, in combination with the worm-gear D, worm $b$, and driving-shaft E, and weighted crank G for indirect and pow erful propulsion, substantially as herein set forth.

2. The combination of the three threaded spindles n n and n' with the jaws K L and pinions p p and p', substantially as and for the purpose herein set forth.

3. The combination of the threaded spindles, jaws, and pinions with the hollow spindle, its handles, worm-gear, and threaded collar, and the head with the cutting-off tool and die-holding devices, substantially as and for the purposes herein set forth.

In testimony that I claim the foregoing as my own I affix my signature in presence of two witnesses.

CHAS. T. LITCHFIELD.

Witnesses:
  CHAS. H. WATSON,
  MATTHEW DALY.